Nov. 28, 1950 G. TREGLOWN ET AL 2,532,207
AUTOMATIC FEED HEAD
Filed June 6, 1945 2 Sheets-Sheet 1

INVENTORS
CLAUDE E. BRODERS &
GEORGE TREGLOWN
BY Gray and Smith
ATTORNEYS

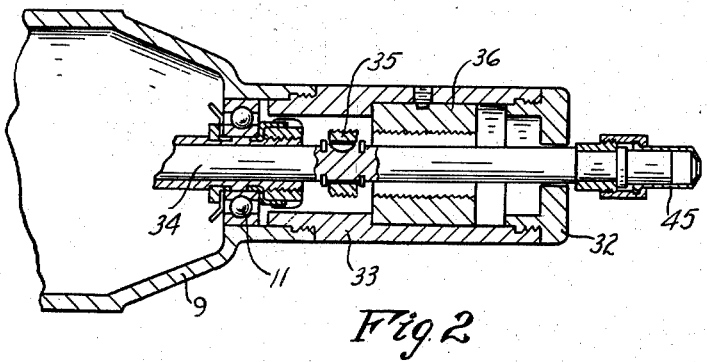
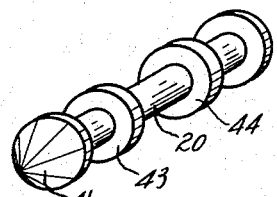
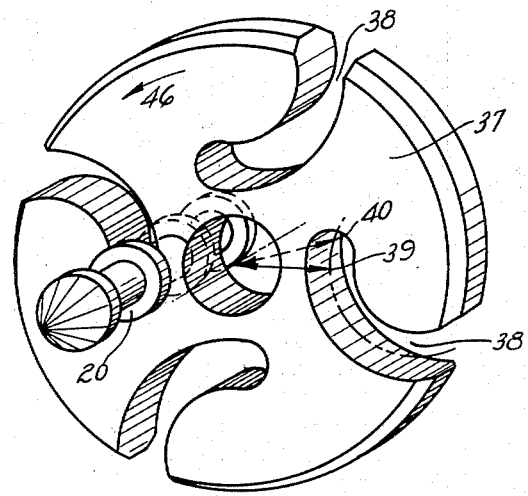

UNITED STATES PATENT OFFICE 2,532,207

AUTOMATIC FEED HEAD

George Treglown and Claude E. Broders, Detroit, Mich., assignors, by mesne assignments, to Govro-Nelson Company, Detroit, Mich., a corporation of Michigan Application June 6, 1945, Serial No. 597,837

11 Claims. (Cl. 10—139)

The present invention relates to an automatic feed head and particularly to such a feed head in which a rotating spindle is advanced automatically relative to a work piece by centrifugal forces generated in a plurality of rotating weight members and is automatically retracted therefrom at the completion of the feeding stroke. In the present feed head, the rotating spindle is retracted upon rotation of the driving shaft in the direction opposite to the direction of rotation for advancing the spindle and the rotating weight members are rendered inactive during the reverse rotation of the spindle.

A device embodying the present invention is particularly but not exclusively adapted for use in an automatic tapping machine in which a thread cutting tap is utilized to cut threads in a work piece during the forward or feeding cycle of the device during which time a feeding pressure is exerted by the centrifugal forces generated in the rotating weight members. Reversal of the direction of the driving shaft inactivates the centrifugally actuated weight members and permits the return of the thread cutting tap according to the characteristics of the threads cut in the work piece during the feed stroke. It is to be understood, however, that the device of the present invention is not necessarily limited to use in automatic tapping units, but may be used generally as an automatic feed head in which a rotary spindle is advanced during a feeding stroke and is retracted at the completion of the feeding stroke by a reversal of the direction of rotation of the power shaft.

An object of the present invention is to provide an automatic feed head which is particularly but not exclusively adapted for use in tapping threads in a work piece in which the feeding pressure on the rotating spindle is generated by centrifugal forces developed in a plurality of rotating weight members, the tool being retracted by rotation of the spindle in a direction opposite to the direction of rotation during the feeding stroke, said centrifugal weights being inactivated during the retraction of said spindle.

A further object of the present invention is to provide an automatic feed head in which the feeding pressure effecting advancement of a rotary spindle toward a work piece is developed by centrifugal forces generated in a plurality of rotating weight members driven by the rotating power shaft, and in which the feeding characteristics of the weight members may be modified by the provision of a suitable lead screw mechanism.

A further object of the present invention is to provide a feed head in which the feeding pressure on a rotating spindle is provided by a plurality of centrifugally actuated members on the rotation of the spindle in one direction and in which provision is made for inactivating the centrifugal members upon rotation of the spindle in the opposite direction.

A further object of the present invention is to provide an automatic feed head in which feeding pressures are exerted on a rotating tool by centrifugal forces generated by a plurality of rotating weight members and in which provision is made for inactivating said rotating weight members upon rotation of the tool in the opposite direction.

Automatic feed head devices in which the centrifugal forces generated in a plurality of rotating weight members are utilized to effect a feeding movement of the tool holding spindle shown in Broders Patent No. 2,053,514, Broders and Gauvreau Patent No. 2,280,115, and in the co-pending applications of Broders Serial No. 597,836 (issued August 26, 1947, as Patent Number 2,426,386) and Serial No. 597,835 (now abandoned), all of which are assigned to Victor Gauvreau. In all of the devices shown in said patents and co-pending applications, the centrifugally actuated rotating weight members are returned to their initial or non-feeding position when the power shaft is stopped. The retraction of the tool in these devices is effected by return springs. In the said devices, the tool is retracted from the work piece without reversing its direction of rotation.

As distinguished from the devices of the said patents and co-pending applications, the automatic feed head of the present invention is intended to retract the tool from the work piece while the tool is rotated in a direction counter to the direction of rotation during its feeding stroke. In the device of the said patents and applications, such rotation of the tool in an opposite direction during the retraction stroke would activate the centrifugally actuated rotating weight members and cause them to exert feeding pressures on the rotating tool during its reverse rotation. Such action is particularly undesirable when the device is to be used as an automatic tapping unit. As will be hereinafter pointed out, the present invention provides a device in which the centrifugally actuated weight members are inactivated during the retraction of the tool while being rotated in a direction opposite to the direction of rotation during its feeding stroke.

Other objects of this invention will appear in the following description and appended claims, reference being had to the accompanying drawings forming a part of this specification wherein like reference characters designate corresponding parts in the several views.

In the drawings:

Fig. 2 is a fragmentary longitudinal section of an attachment for the feed head shown in Fig. 1.

Fig. 3 is an isometric view of the weight spacing and locking member utilized in the feed head embodying the present invention.

Fig. 4 is an isometric view of one of the centrifugally actuated rotating weight members utilized in a device embodying the present invention.

Figure 1:
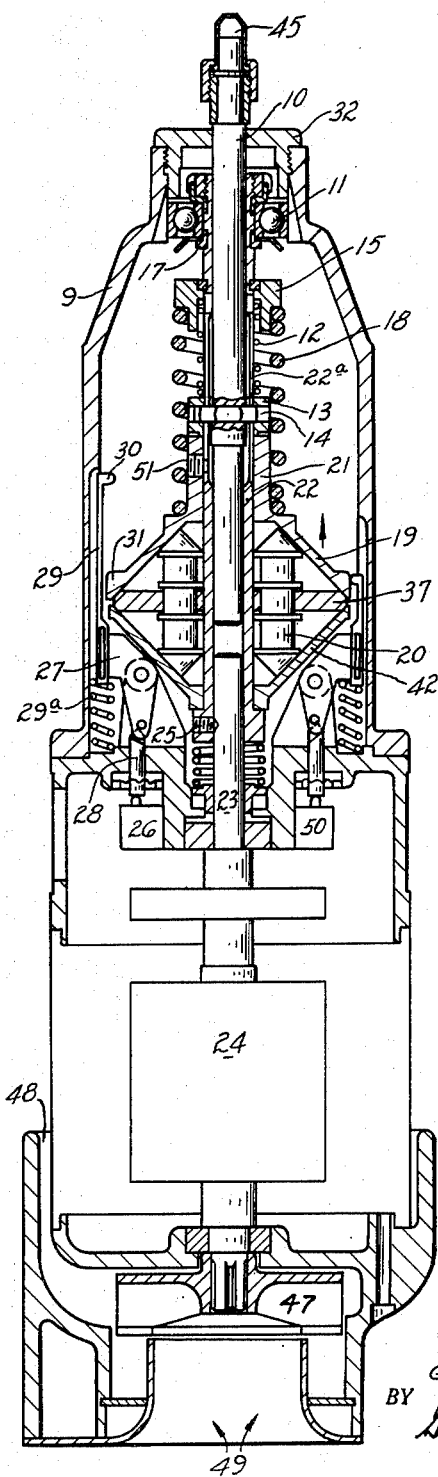
Fig. 1 is a longitudinal cross-section of an automatic feed head embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A feed head embodying the present invention is shown in Fig. 1 and comprises a rotatable and axially movable spindle 10, which is supported in the feed head housing 9 by ball bearings 11 and maintained in the retracted position within the said housing as shown in Fig. 1, by the action of the spring 12, which seats on a collar 13 attached to the spindle 10 and the tubular quill 22 by the key 14. The collar 13 and the spindle 10 are thus connected for rotation with the tubular quill 22. A longitudinal slot 22a in the tubular quill 22 permits axial movement of the key 14, the collar 13 and spindle 10 relative to the quill 22. As here shown, one end of the spindle 10 telescopes within the tubular quill 22. The other end of spring 12 seats on a collar 15 which is fixed to the quill 22. The collar 15 also provides a seat for the spring 18, which bears upon an axially movable conical cup 19. A fixed conical cup 42 is connected with the tubular quill 22 and is provided with a conical interior chamber which with a similar chamber in conical cup 19, provides a housing for a plurality of centrifugal weight members 20. The axially movable conical cup 19 has a hub 21, which is slidable on the tubular quill 22. The conical cup member 19 is also secured to the tubular quill 22 for rotation therewith while being free for axial movement relative thereto, by a set screw 51, which has an end extending into the slot 22a.

Axial movement of the conical cup 19 in the direction of the arrow engages the hub section 21 with the keyed collar 13, which in turn moves the spindle 10 axially of the housing 9. The advance movement of the spindle 10 is accomplished during rotation of the spindle 10 for as above described, the keyed engagement with the tubular quill 22 permits axial movement of the spindle 10 while being rotated by the tubular quill 22. The tubular quill 22 is connected by a set screw 25 to the output shaft 23 of an electric motor 24.

A reversing switch 26 is electrically connected with the motor 24 and is actuated by switch operating lever 27 acting on the plunger 28 which actuates the switch 26. A lever extension 29 has a cam end 30 which is actuated by engagement with the rim 31 of the axially movable conical cup member 19 when it has reached a predetermined point. The switch operating lever 27 is operatively connected with the lever extension 29 so that upon movement of the lever extension 29 the lever 27 is actuated and the switch mechanism 26 is operated to stop and reverse the motor 24. A spring 29a returns the switch operating lever 27 and its extension 29 to the positions shown in Fig. 1 after operation of the switch 26. A second reversing switch mechanism indicated generally at 50 is electrically connected with the motor 24 and the switch 26, and is actuated upon the return of the axially movable cup 19. The switch mechanism 50 may be utilized, if desired, to reverse the motor 24 and establish the forward feeding stroke of the spindle 10, or it may be used to control the operation of an auxiliary unit, such for example as a work feeding device or a work holding fixture. When used to control an auxiliary unit, a reversing switch mechanism may be provided which is preferably manually operated.

The centrifugal weights 20 are symmetrically disposed in a disc 37, carried by the tubular quill 22 and rotatable therewith. The disc 37 is shown in isometric view in Fig. 3. As here shown the weights 20 are each maintained in a slot 38, each of which is in the form of a path ending at the periphery of the disc 37 and extending inwardly therefrom on an arcuate path sufficiently extended so that the center line of the slot 38 passes a point of minimum distance 39 from the center of the disc 37, and extends past said point to a point 40 where the center line of the slot 38 is at a greater distance from the center of the disc 37 than at the point 39. This is shown graphically in Fig. 3 wherein the center line of one of the slots 38 is indicated by the dotted line. Radial arrows indicate that the radial distance from the center of disc 37 at point 39 is less than the radial distance from the center of disc 37 at point 40. As shown in Fig. 1, the peripheral edge portions of the disc 37 extend between and are gripped by the adjacent tip portions of the cups 19 and 42.

In Fig. 3 one of the centrifugal weight members is shown in position in the disc 37. It is to be understood, however, that a centrifugal weight member 20 is provided in each of the slots 38. While four of the slots 38 are shown in Fig. 3, it is to be understood that any desired number of slots and a corresponding number of weight members may be provided. Each of the weight members 20 corresponds in construction to that shown in Fig. 4, and is provided with conical end faces 41 at each end for engagement with the inner conical chambers of the conical cups 19 and 42. Aligning collars 43 and 44 are provided to maintain a fixed axial relationship between the centrifugal weights 20 and the disc 37.

A tool holding collet 45 is attached to the end of the rotating spindle 10, and carries a rotating tool (not shown). When the motor 24 is actuated to impart the direction of rotation to the disc 37 as indicated by the arrow 46 (Fig. 3) the weights 20 each roll outwardly in the curved paths provided by the slots 38 in the disc 37. This outward movement of the weights 20 causes them to exert a pressure between the fixed cup member 42 and the axially movable cup member 19 and to move the axially movable cup member 19 in the direction of the collar 13 and as the hub 21 contacts the collar 13, the spindle 10 is moved to impart a feeding movement of the tool carried in the collet 45.

This feeding movement continues until the rim 31 of the cup 19 engages the cam end 30 of the lever extension 29 and effects operation of the switch 26 as previously described. The actuation of the switch 26 stops and reverses the motor 24. Stoppage of the motor 24 eliminates the forces driving the centrifugal weights 20 outward in the slots 38. During the interval before the reversal of the motor, the quill 22 is stationary during which interval, the weights 20 are moved in the curved slots 38 toward the center of the disc 37 and come to rest in the slots 38 adjacent the point 39 of minimum distance from the center of the disc 37. When the weights 20 are so moved by the spring 18, the spring 18 simultaneously returns the axially movable cup 19 to the position shown in Fig. 1 and the peripheral edges of the spacer disc 37 are gripped between the adjacent lips of the cups 19 and 42. Thus when the reverse rotation actually takes place, the disc 37 is positively rotated in the reverse direction. The inertia of the weights 20 upon rotation of the spacer 37 in the reverse direction, holds the weights 20 in the ends of the slots 38, adjacent the point 40. Since the point 40 in the slots 38 is a greater radial distance from the center of the spacer 37 than is the point 39, the centrifugal weights are locked in a non-feeding or inactivative position during the entire reverse rotation cycle.

During the reverse rotation of the motor 24, a force is exerted by the spring 12 on the spindle 10 to assist in its return. The return of the cup 19 to the position shown in Fig. 1 actuates switch 50 which either stops motor 24 and establishes a direction of rotation for again feeding the spindle 10 toward the work piece or actuates an auxiliary unit in which event a manually actuated switch is provided to reestablish the feeding stroke of the unit. When the motor 24 is stopped after its reverse rotation, the inertia forces in the weights 20 causes them to move away from the extreme ends of the slots 38 and the points 39 of minimum distance from the center of disc 37. The centrifugal forces of rotation then will cause the weights to move outwardly in the slots 38 and exert a feeding pressure on the axially movable cup 19 and on the spindle 10.

The motor 24 is preferably cooled by a flow of air which is circulated through an air inlet opening 49 by an air impeller 47, and discharged through air discharge ducts 48 opening on the housing of the motor 24.

When used as a thread tapping feed head reversal of current in motor locks the rotating weights 20 in a non-feeding position, as above described. Usually there is sufficient friction between the work piece and the thread cutting tap that upon stoppage of the motor 24 all further rotation of the quill 22 and the weights 20 stops. In those instances where this friction is insufficient to prevent further rotation of the quill 22 and the weights 20, or where a more rapid stopping of the rotation of quill 22 and the weights 20 is desired, the brake mechanism shown in the Broders and Gauvreau Patent No. 2,280,115 or as shown in co-pending Broders application Serial No. 597,835 may be employed.

When used as a tapping unit the feeding effect of the centrifugal weight members 20 may be modified by the use of a lead screw attachment which may be attached to the device shown in Fig. 1. The lead screw attachment is shown in Fig. 2 and comprises a housing 33 which may be attached to the unit shown in Fig. 1 by the removal of the sealing cap 32. When the sealing cap 32 has been removed from the end of the housing 9 of the device shown in Fig. 1, the housing 33 of the lead screw attachment may be screwed into the opening in the housing 9 formerly closed by the cap 32. The cap 32 is then replaced at the end of the housing 33 as shown in Fig. 2. A spindle 34 is mounted in the housing 33 and replaces the spindle 10 shown in Fig. 1. A male threaded collar 35 is secured to the spindle 34 and engages with the threads in the female threaded collar 36. Advancement of the spindle 34 toward the work piece to the point where the male threads of the collar 35 engage the female threads of the collar 36 is accomplished by the movement of the weights 20 in the same manner as that previously described in connection with the advancement of the spindle 10. Further advancement of the spindle 34 is controlled by the pitch of the mating threads on the collars 35 and 36, and the rate of rotation of the spindle 34. While the feeding rate is controlled by the threaded collars 35 and 36, the weight members 20 provide a feeding force which keeps the threads in the collars 35 and 36 in engagement. Retraction of the spindle 34 in the use of this attachment is accomplished by reversing the direction of rotation of the spindle 34, thus unthreading the member 35 from the member 36. The cup 19 is returned and the weights 20 occupy their inactivated positions as above described during this unthreading cycle. After the threads are disengaged, the further retraction of the spindle 34 is accomplished by the spring 12 in the same manner as previously described with respect to the retraction of the spindle 10.

We claim:

1. An automatic feed head comprising an axially movable rotatable tool spindle, a power driven quill for rotating said spindle, weight members actuated by said power driven quill to generate centrifugal forces upon rotation of said quill, a fixed member fixed on said quill against relative movement with respect thereto and positioned adjacent one end of said weight members, an axially movable member mounted on said quill and connected with said spindle and a spacer disc carried on said quill and disposed between said fixed member and said axially movable member and having a plurality of symmetrically disposed radially extending arcuate weight carrying slotways each open at the periphery of said disc and each having a closed end adjacent the center of said disc, one of said weight members being disposed in and movable within each of the slotways of said disc.

2. An automatic feed head comprising an axially movable rotatable tool spindle, a power driven quill for rotating said spindle, a plurality of movable weight members actuated by said power driven quill and movable radially outward from said quill upon its rotation, each of said weight members comprising a generally cylindrical body portion having conical end cap portions on each end and having spaced collars extending around the said body portion approximately midway of said ends, a fixed member fixed on said quill against relative movement with respect thereto and positioned adjacent one end of said weight members, an axially movable member mounted on said quill and connected with said spindle and a spacer disc carried on said quill and disposed between said fixed member and said axially movable member and having a plurality of symmetrically disposed radially extending arcuate weight carrying slotways each open at the periphery of said disc and each having a closed end adjacent the center of said disc, one of said weight members being disposed in and movable within each of the slotways of said disc.

3. An automatic feed head comprising an axially movable rotatable tool spindle, a power driven quill for rotating said spindle, weight members actuated by said power driven quill to generate centrifugal forces upon rotation of said quill, a fixed member fixed on said quill against relative movement with respect thereto and positioned adjacent one end of said weight members, an axially movable member mounted on said quill and connected with said spindle and a spacer disc carried on said quill and disposed between said fixed member and said axially movable member and having a plurality of symmetrically disposed slotways each extending inwardly from the periphery of said spacer disc in an arc extending to a point adjacent the center of said spacer disc and thence extending to a closed end portion lying outwardly in the direction of the periphery of said spacer disc, one of said weight members being disposed in and movable within each of the slotways of said disc.

4. An automatic feed head comprising an axially movable rotatable tool spindle, a power driven quill for rotating said spindle, a plurality of movable weight members actuated by said power driven quill and movable radially outward from said quill upon its rotation, each of said weight members comprising a generally cylindrical body portion having conical end cap portions on each end and having spaced collars extending around the said body portion approximately midway of said ends, a fixed member fixed on said quill against relative movement with respect thereto and positioned adjacent one end of said weight members, an axially movable member mounted on said quill and connected with said spindle and a spacer disc carried on said quill and disposed between said fixed member and said axially movable member and having a plurality of symmetrically disposed slotways each extending inwardly from the periphery of said spacer disc in an arc extending to a point adjacent the center of said spacer disc and thence extending to a closed end portion lying outwardly in the direction of the periphery of said spacer disc, one of said weight members being disposed in and movable within each of the slotways of said disc.

5. An automatic feed head as claimed in claim 1 and further characterized in that the peripheral edge portion of said spacer disc extends between said fixed member and said axially movable member and is engaged thereby at the end of each feeding cycle.

6. An automatic feed head as claimed in claim 2 and further characterized in that said fixed member and said axially movable member are hollow conical cups having interior wall surfaces for engaging the conical end surfaces of said weight members in a common plane.

7. An automatic feed head as claimed in claim 2 and further characterized in that said spaced collars on said weight members are disposed adjacent the opposite faces of said spacer member to maintain said weights in a predetermined position relative to said spacer while permitting their free rotation about their longitudinal axes.

8. An automatic feed head as claimed in claim 4 and further characterized in that said weight members are mounted for free rotation about their longitudinal axes while travelling in said slotways and are held in predetermined position relative to said spacer by contact of said spaced collars with opposite faces of said spacer.

9. An automatic feed head comprising a rotatable axially movable toolholding spindle, power means for rotating said spindle, a plurality of weight members mounted for rotation about the longitudinal axis of said spindle by said power means and movable radially with respect to said spindle by centrifugal forces of rotation generated in said weight members, means connecting said weight members and said spindle whereby axial movement of said spindle is effected by the outward radial movement of said weight members relative thereto, means for reversing the direction of rotation of said power means when said spindle has reached a predetermined point in its axial movement and a disc mounted for rotation with said spindle and having a plurality of slots for carrying said weight members, said weight members being disposed in and movable within said slots, each of said slots extending inwardly from the circumference of said disc to a point adjacent the axis thereof and thence continuing to a closed end portion lying outwardly from said point in the direction of the circumference of said disc for holding said weight members against radial movement during the reverse rotation of said power means.

10. An automatic feed head as claimed in claim 9 and further characterized in that each of said weight members is mounted for free rolling movement in one of the slots in said disc.

11. An automatic feed head comprising a rotatable axially movable toolholding spindle, power means for rotating said spindle, a plurality of circumferentially spaced weight members mounted for rotation about an axis perpendicular to the plane of said circumference and passing through the center thereof by said power means and movable radially with respect to said axis by centrifugal forces of rotation generated in said weight members, means connecting said weight members and said spindle whereby axial movement of said spindle is effected by the outward radial movement of said weight members relative thereto, means for reversing the direction of rotation of said power means when said spindle has reached a predetermined point in its axial movement and a disc mounted for rotation with said spindle and having a plurality of slots for carrying said weight members, said weight members being disposed in and movable within said slots, each of said slots extending inwardly from the circumference of said disc from a point adjacent the axis thereof and thence continuing to a closed end portion lying outwardly from said point in the direction of the circumference of said disc for holding said weight members against radial movement during the reverse rotation of said power means.

GEORGE TREGLOWN.
CLAUDE E. BRODERS.

REFERENCES CITED

The following references are of record in the file of this patent:

UNITED STATES PATENTS

| Number | Name | Date |
|---|---|---|
| 1,640,177 | Bishop et al. | Aug. 23, 1927 |
| 1,801,590 | Dickson | Apr. 21, 1931 |
| 1,970,218 | Bishop et al. | Aug. 14, 1934 |
| 2,053,514 | Broders | Sept. 8, 1936 |
| 2,207,340 | Claus | July 9, 1940 |
| 2,280,115 | Broders et al. | Apr. 21, 1942 |
| 2,340,735 | Claus | Feb. 1, 1944 |
| 2,346,359 | Claus | Apr. 11, 1944 |